(No Model.)
T. P. FORD.
VALVE.
No. 489,799. Patented Jan. 10, 1893.
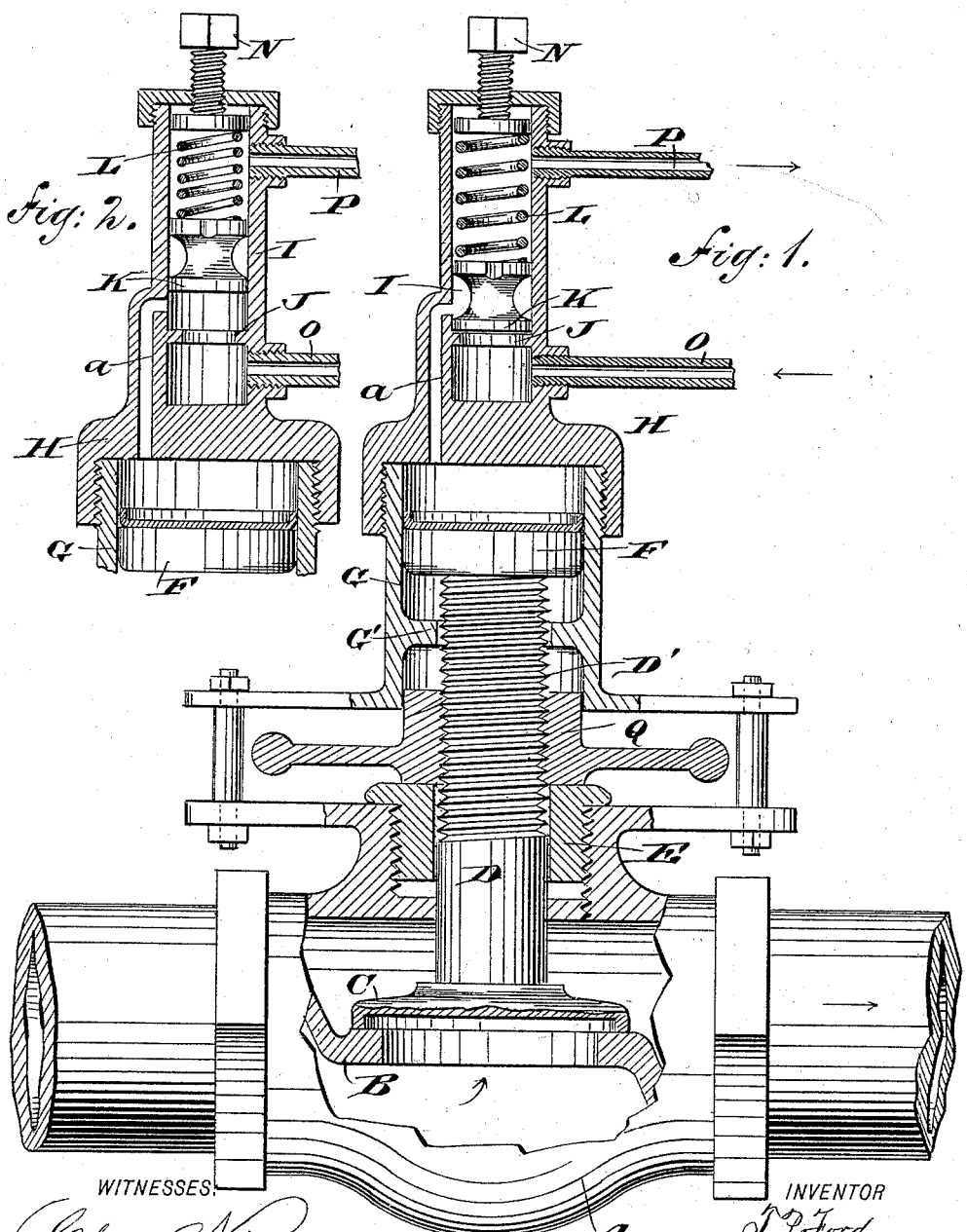
WITNESSES
Chas. Nida.
C. Sedgwick
INVENTOR
T. P. Ford
BY Munn & Co.
ATTORNEYS.

UNITED STATES PATENT OFFICE.

THOMAS P. FORD, OF BROOKLYN, NEW YORK.

VALVE.

SPECIFICATION forming part of Letters Patent No. 489,799, dated January 10, 1893.

Application filed July 2, 1892. Serial No. 438,747. (No model.)

*To all whom it may concern:*

Be it known that I, THOMAS P. FORD, of Brooklyn, in the county of Kings and State of New York, have invented a new and Improved Valve, of which the following is a full, clear, and exact description.

The object of the invention is to provide a new and improved valve, which is simple and durable in construction, very effective in operation, more especially designed for use on hydraulic elevators and other machinery, and arranged to insure the perfect seating of the valve.

The invention also consists of certain parts and details and combinations of the same, as will be fully described hereinafter and then pointed out in the claims.

Reference is to be had to the accompanying drawings forming a part of this specification, in which similar letters of reference indicate corresponding parts in both the figures.

Figure 1 is a sectional side elevation of the improvement; and Fig. 2 is a sectional side elevation of part of the improvement in a different position.

The improved valve is provided with the body A, in which is formed the usual valve seat B, the opening of which is adapted to be closed by the valve C proper, as shown in Fig. 1. The stem D of the valve C extends upward through a stuffing box E held on the valve body A, and on the extreme upper end of the stem is attached a piston F, fitted to slide in a cylinder G supported from the valve body A. In the cap H of the cylinder G is formed a port $a$ which leads into the upper end of the cylinder G and connects with a cylinder I formed near its lower end with a valve seat J for the auxiliary valve K. The latter is normally held on its seat J by a spring L, the tension of which can be regulated by a set screw N screwing in the cap of the auxiliary cylinder I. Into the lower end of the latter leads an inlet pipe O and from the upper end of the same extends an outlet pipe P.

In order to set the valve C, the stem D is formed with a screw thread D' engaged by a wheel nut Q, fitted to slide in the lower open end of the cylinder G, the upward movement being limited by an annular flange G' formed interiorly of the cylinder G. The bottom of the nut is adapted to be seated on top of the stuffing box E, as shown, so that the movement of the nut is limited between the flange G' and the said stuffing box.

By turning the wheel nut Q the opening of the valve C above the seat B can be conveniently regulated according to the amount of fluid required to pass through the valve body. When the several parts are in the position shown in Fig. 1, the valve C will open under pressure in the usual manner, the piston F then sliding upward in the cylinder G. As the upper end of the latter is connected by the port $a$ and auxiliary cylinder I with the outlet P, no additional resistance is encountered by the said valve.

When the valve is to be seated, a fluid is passed through the pipe O under pressure, into the lower end of the auxiliary cylinder I, so that the fluid raises the auxiliary valve K which thus slides upward and compresses the spring L and at the same time closes the port $a$ to the upper end of the cylinder and establishes communication between the said port $a$ and the lower end of the cylinder containing the incoming fluid under pressure. The fluid thus passes through the port $a$ into the upper end of the cylinder G and therein exerts its pressure on the piston F so as to force the latter downward so that the valve C is seated on the seat B. It will be seen that this action is positive so that the valve C must seat itself on the seat B. When the pressure of the fluid passing through the pipe O diminishes or ceases altogether, then the force of the spring L returns the auxiliary valve K to its former position on the seat J, as shown in Fig., 1 so that the port $a$ again communicates with the upper end of the auxiliary cylinder I and the fluid can pass from the upper end of the cylinder G through the said port into the upper end of the cylinder I and out through the outlet P. The pressure is thus removed from the piston F, and conseqently the valve C can again open by the pressure of the fluid passing into the body A and pressing against the under side of the valve C. It is understood that when the pressure of the fluid entering the auxiliary cylinder I through pipe O is less than the force of the spring, the piston K moves downward and forces the fluid in the lower part of cylinder I out through pipe O. Thus it will be seen that the closing of the valve C is insured, and takes place automatically whenever the pressure of the fluid, passing through the pipe O into the cylinder, raises the valve K to establish communication between the lower end of the auxiliary cylinder I and the upper end of the cylinder G, as will be readily understood by reference to Fig. 2. Thus the valve C is automatically controlled by a fluid under pressure.

Having thus fully described my invention, I claim as new and desire to secure by Letters Patent;—

1. In a device of the class described, the combination with a valve carrying a piston on its stem, of a cylinder containing the said piston, an auxiliary cylinder provided with an inlet and an outlet and connected by a port with the upper closed end of the said first named cylinder, and a spring pressed piston valve held to slide in the said auxiliary cylinder and arranged to connect the said port with the said outlet or with the said inlet, substantially as shown and described.

2. In a device of the class described, the combination with a valve body containing a seat and a cylinder supported from the said valve body, of a piston valve of which the valve is to be seated on the said seat and its piston is fitted to slide in the said cylinder, an auxiliary cylinder supported on the said first-named cylinder and provided with a port leading into the upper end of the said cylinder, an inlet pipe for the lower end of the said cylinder, an exhaust or outlet pipe for the upper end of the said auxiliary cylinder, and a spring-pressed valve adapted to be seated in the said auxiliary cylinder and arranged so as to establish communication between the said cylinder and the outlet pipe and, when forced upward, to disconnect the same and establish communication between the upper end of the cylinder and a fluid pressure supply, substantially as shown and described.

3. In a device of the class described, the combination with a valve body containing a seat, of a cylinder supported from the said valve body, a valve adapted to be seated on the said seat and having a piston fitted to slide in the said cylinder, the stem of the said piston valve connecting the piston with the valve and being partly screw-threaded, a nut engaging the said screw-threaded stem and having a limited motion between the valve body and cylinder, and an auxiliary cylinder in communication with the upper end of the said first named cylinder and containing a valve adapted to be lifted by a fluid under pressure, to permit the said fluid under pressure to pass into the upper end of the said auxiliary cylinder, substantially as shown and described.

THOMAS P. FORD.

Witnesses:
 THEO. G. HOSTER,
 C. SEDGWICK.